United States Patent
Tachino et al.

(10) Patent No.: US 7,626,909 B2
(45) Date of Patent: Dec. 1, 2009

(54) OPTICAL RECORDING MEDIUM, INFORMATION PROCESSING DEVICE USING THE RECORDING MEDIUM, AND DATA RECORDING METHOD

(75) Inventors: Ryuya Tachino, Kanagawa (JP); Susumu Senshu, Kanagawa (JP); Shoei Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/519,697

(22) PCT Filed: Jun. 24, 2003

(86) PCT No.: PCT/JP03/07999

§ 371 (c)(1),
(2), (4) Date: Dec. 27, 2004

(87) PCT Pub. No.: WO2004/003910

PCT Pub. Date: Jan. 8, 2004

(65) Prior Publication Data

US 2006/0023601 A1 Feb. 2, 2006

(30) Foreign Application Priority Data

Jun. 28, 2002 (JP) ............................. 2002-189347

(51) Int. Cl.
*G11B 20/12* (2006.01)
(52) U.S. Cl. ................................. 369/59.25; 369/275.3
(58) Field of Classification Search ............... 369/59.1, 369/59.2, 59.19, 275.1, 275.3, 59.25
See application file for complete search history.

(56) References Cited

U.S. PATENT DOCUMENTS

| 5,754,522 | A | * | 5/1998 | Kobayashi et al. | ........ 369/275.3 |
| 6,067,281 | A | * | 5/2000 | Kobayashi et al. | ........ 369/47.14 |
| 6,097,695 | A | * | 8/2000 | Kobayashi | ............... 369/275.4 |
| 6,115,340 | A | * | 9/2000 | Van Den Enden et al. | ........................ 369/47.28 |
| 6,147,957 | A | * | 11/2000 | Nagara et al. | ............. 369/59.11 |
| 6,469,980 | B1 | * | 10/2002 | Takemura et al. | ........ 369/275.3 |
| 6,628,584 | B1 | * | 9/2003 | Heemskerk et al. | ........ 369/47.1 |

(Continued)

FOREIGN PATENT DOCUMENTS

EP 0 837 471 A2 4/1998

(Continued)

*Primary Examiner*—Thang V Tran
*Assistant Examiner*—Linh T Nguyen
(74) *Attorney, Agent, or Firm*—Oblon, Spivak, McClelland, Maier & Neustadt, L.L.P.

(57) ABSTRACT

The present invention is directed to a data recordable optical disc (2), wherein buffer areas for random access (Data Run-in DRi, Data Run-out DRo) for random access are respectively disposed before and after respective blocks (BLK, BLK1, BLK2), whereby when recording of new block is started, the block is recorded in the state where respective buffer areas overlap with each other with respect to new block and existing block so that no gap takes place. Signal patterns for Phase Locked Loop (PLL) at the time of data reproduction, Auto Gain Control (AGC), and automatic adjustment of light source power, synchronization pattern, and/or signal patterns used for generation of reproduction clock, and detection of block reproduction end, etc. are recorded within the buffer area.

26 Claims, 10 Drawing Sheets

U.S. PATENT DOCUMENTS

| | | | |
|---|---|---|---|
| 6,724,707 B2 * | 4/2004 | Van Woudenberg et al. | 369/59.24 |
| 7,215,634 B2 * | 5/2007 | Van Woudenberg | 369/275.3 |
| 2002/0080705 A1 * | 6/2002 | Van Woudenberg | 369/59.25 |
| 2003/0137765 A1 * | 7/2003 | Yamazaki et al. | 360/39 |
| 2003/0206509 A1 * | 11/2003 | Lee et al. | 369/53.15 |

FOREIGN PATENT DOCUMENTS

| | | |
|---|---|---|
| EP | 1 365 403 A2 | 11/2003 |
| JP | 09-027127 | 1/1997 |
| JP | 9-27127 | 1/1997 |
| JP | 11-25459 | 1/1999 |
| JP | 11-025459 | 1/1999 |
| JP | 2001-143406 | 5/2001 |
| JP | 2001-250249 | 9/2001 |
| JP | 2003-512693 | 4/2003 |
| WO | WO 01/29832 | 4/2001 |

* cited by examiner

OPTICAL RECORDING MEDIUM, INFORMATION PROCESSING DEVICE USING THE RECORDING MEDIUM, AND DATA RECORDING METHOD

TECHNICAL FIELD

The present invention relates to a recordable optical recording medium, an information processing apparatus adapted for performing write-once operation or rewrite operation of data onto such optical recording medium, and a method of recording data onto an optical recording medium.

This Application claims priority of Japanese Patent Application No. 2002-189347, filed on Jun. 28, 2002, the entirety of which is incorporated herein.

BACKGROUND ART

In recent years, various recording media for digital data such as DVD (Digital Versatile Disc), etc., have been popularized, and optical disc recording/reproducing apparatuses of large capacity adapted for performing write-once operation or rewrite operation of data to optical discs such as DVD-R (Recordable), or DVD-RW (ReWritable), etc., which are recordable recording media, have been put into practical use. In the apparatuses of this kind, data write operation is performed with address information of block included at pits, wobbled grooves or lands, etc., which are formed in advance on the disc essentially on the error correction (ECC) block basis.

In this instance, it is necessary to consider the system of linking between block and block. With respect to the linking, two systems have been proposed until now when roughly classified.

One system is a system in which importance to compatibility with read only optical disc is attached so that blocks are written in such a manner that they are successive without break in the state where there is no linking portion. As examples employing this system, DVD-R, DVD-RW and/or DVD+RW are mentioned.

The other system is a system in which compatibility with the reproduction only unit of the reproduction only optical disc is disregarded so that linking portions, pit portions used for address information prepared in advance, etc., and/or gap portions of those portions exist between block and block. For example, DVD-RAM employs this system.

In the conventional system, there are problems as described below, for example, in regard to compatibility and/or random accessibility.

First, in the system of writing block without break in the state where there is no linking portion between blocks, write position accuracy of high accuracy is required as compared to the system where there is linking area in write operation of block by random access. As a result, the circuit therefor becomes more complicated, and this is disadvantage in point of cost. Moreover, in readout operation, there are instances where phases of channel bits of block to be read out and block precedent thereto becomes discontinuous. For this reason, if such a measure for giving limitation to the phase relationship of channel bits between blocks such as a method of continuously writing block to be read out and block precedent thereto, etc. is not employed, channel bit phase discontinuous portion between blocks results in disturbance with respect to PLL (Phase Locked Loop) of read-out clock. As a result, there is the possibility that read-out of data may not be stable for a time period until the time when PLL is placed in steady state so that read-out data error takes place. However, when limitation is given to the phase relationship of channel bits between blocks, random accessibility and/or preservation efficiency of data onto the disc may be damaged, e.g., block precedent to write block also must be written as dummy block, etc.

Further, in the system in which gap portion exists between blocks, in the case where the reproduction only unit of the reproduction only optical disc is used to attempt to reproduce recordable optical disc, difference between physical specifications between the recordable optical disc and the reproduction only optical disc must be taken into consideration. For example, it is necessary to design reproduction system circuit such as Auto Gain Control (AGC), etc., in consideration of the fact that the portion where there is no amplitude, i.e., gap exists in reproduction waveform. For this reason, it is required to switch operation mode of the circuit between reproduction of the reproduction only optical disc and reproduction of reproducible/recordable optical disc, or to switch the circuit itself, leading to elevation of the apparatus cost.

As stated above, in the conventional linking form, when importance to cost is attached, it is the actual circumstances that there is nothing but way to select any one of hardware compatibility with the reproduction only optical disc and random accessibility.

DISCLOSURE OF THE INVENTION

An object of the present invention is to provide a novel optical recording medium, an information processing apparatus using such a recording medium, and a recording method for data which can solve problems that optical recording media where recording of data is permitted and information processing apparatuses adapted for performing write-once or rewrite operation of data with respect to such optical recording media have, which have been conventionally proposed as described above.

Another object of the present invention is to provide an optical recording medium, an information processing apparatus using such a recording medium, and a recording method for data which can realize linking system between blocks which is excellent in compatibility with read only optical recording medium and has random accessibility at the time of recording and at the time of reproduction in recording/reproducing apparatus adapted for performing write-once or rewrite operation of data onto recordable optical recording medium.

The optical recording medium according to the present invention is directed to an optical recording medium in which write-once or rewrite operation of data can be performed with block including a group of data being as unit, wherein buffer areas for random access are respectively disposed before and after respective blocks, whereby when new block is recorded, the block is recorded in the state where a buffer area provided with respect to the block and a buffer area provided with respect to an existing block adjacent to the block overlap with each other.

In the optical recording medium according to the present invention, when recording of new block is started with respect to a first block and a second block which have been already recorded, the block is recorded in the state where a buffer area disposed immediately before the block and a buffer area disposed immediately after the first block adjacent to the block overlap with each other, and when recording of the block is completed, the block is recorded in the state where a buffer area disposed immediately after the block and a buffer area disposed immediately before the second block adjacent to the block overlap with each other.

In accordance with the present invention, buffer areas are provided before and after the block, thereby making it possible to easily perform random access, and also making it possible to form linking area on the basis of buffer areas overlapping with each other so that any gap does not take place between blocks.

Moreover, the present invention is directed to an information processing apparatus adapted for performing recording or reproduction of information to an optical recording medium in which write-once or rewrite operation of data can be performed with block including a group of data being as unit, the information processing apparatus including data recording means for generating recording channel data in which buffer areas for random access are added before and after respective blocks to record the data onto an recording medium, whereby when recording of a new block is started with respect to a first block and a second block which have already been recorded, the block is recorded in the state where a buffer area disposed immediately before the block and a buffer area immediately after the first block adjacent to the block overlap with each other, and when recording of block is completed, the block is recorded in the state where the buffer area disposed immediately after the block and a buffer area disposed immediately before the second block adjacent to the block overlap with each other.

Further, the present invention is directed to a recording method for performing write-once or rewrite operation of data with block including a group of data being as unit, wherein buffer areas for random access are respectively disposed before and after respective blocks, whereby when new block is recorded, the block is recorded in the state where a buffer area provided with respect to the block and a buffer area provided with respect to an existing block adjacent to the block overlap with each other.

Still further objects of the present invention and practical merits obtained by the present invention will become more apparent from the description of the embodiments which will be given below with reference to the attached drawings.

BRIEF DESCRIPTION OF THE DRAWINGS

FIGS. 4 to 10 are views for explaining channel data at the time of recording/reproduction, wherein FIG. 4 is a view showing the state where RUB corresponding to one block is recorded, FIG. 5 is a view showing the state where plural successive RUBs are recorded, FIG. 6 is a view showing a configuration example of cluster, FIG. 7 is a view showing a configuration example of data run-in, FIG. 8 is a view showing a configuration example of preamble, FIG. 9 is a view showing a configuration example of data run-out, and FIG. 10 is a view showing a configuration example of postamble.

BEST MODE FOR CARRYING OUT THE INVENTION

The present invention relates to an optical recording medium in which write-once or rewrite operation of data can be performed with block including a group of data being as unit, an information processing apparatus using such optical recording medium, and a recording method onto optical recording medium. Particularly, in the case where the present invention is applied to an optical recording/reproducing apparatus adapted for performing write-once or rewrite operation of data onto recordable optical disc, there is realized linking system between blocks in which compatibility with read only optical disc is maintained and also having random accessibility at the time of recording/reproduction.

In the linking system in the present invention, buffers having sufficient sizes for the purpose of easily performing perfect random access are provided before and after blocks including a group of data. Namely, buffer areas for random access are respectively disposed before and after respective blocks.

In the following explanation, the buffer area positioned before block is called "data run-in" and the buffer area positioned after block is called "data run-out". With respect to these buffer areas, as shown in FIG. 1, at the time of start of recording or at the time of end of recording, recording is made in the state where the buffer area provided with respect to corresponding block and the buffer area provided with respect to existing block adjacent to the corresponding block overlap with each other.

Figure 1:
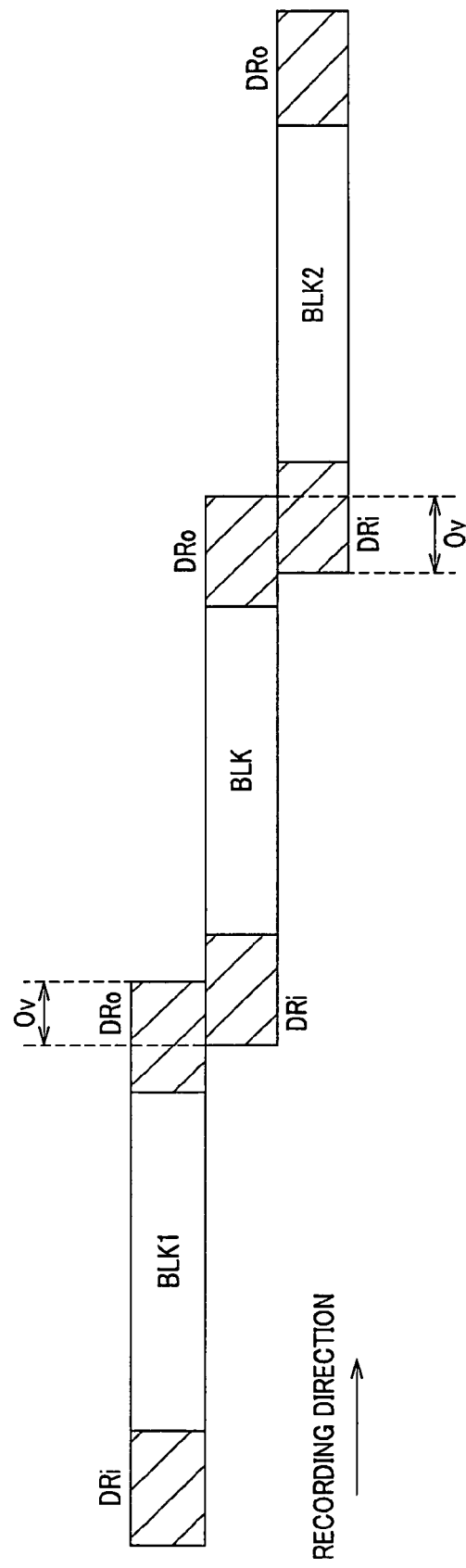
FIG. 1 is a conceptual view for explaining linking system applied to optical disc according to the present invention.

In the conceptual view shown in FIG. 1, "BLK", "BLK1", "BLK2" represent block, and "DRi" and DRo" respectively represent data run-in and data run-out.

Processing unit according to recording channel data or reproduction channel data (recording unit block) consists of blocks and buffer areas before and after those blocks. For example, BLK consists of data run-in DRi positioned before the BLK and data run-out DRo positioned after the BLK. It is to be noted that indication is made in the state where three recording unit blocks are positionally shifted in FIG. 1. In "RUB" which will be described later, the recording unit block will be further explained.

"Ov" indicates the range overlapping between data run-in and data run-out. When recording of block BLK is newly started with respect to the existing block, the block is recorded in the state where data run-in disposed before existing block and data run-out disposed after block BLK1 adjacent to the existing block (existing preceding block) overlap with each other. When recording of block BLK is completed, the block is recorded in the state where data run-out disposed after the existing block and data run-in disposed before block BLK2 adjacent to the existing block (existing succeeding block) overlap with each other.

As stated above, at the time of starting of recording of block, buffer areas overlap with each other between corresponding block and block before the recording start block. Moreover, at the time of recording end, buffer areas overlap with each other between corresponding block and block subsequent to recording end block. Thus, it is guaranteed that no gap is formed between blocks.

The linking area is constituted by already recorded buffer area and buffer area of block to be newly recorded in regard to recording unit block. For example, the linking area is constituted by data run-out of precedent recording unit block and data run-in of new recording unit block.

Overlap taking place at the time of recording partially takes place within buffer area instead of overlap extending over the entire area in regard to buffer area. In this instance, the area which does not overlap (area within data run-in) has sufficient length as buffer area for signal processing such as pull-in of PLL, etc. For example, in regard to data run-in disposed immediately before block, in the configuration including guard area for overlap at the time of recording, and preamble for signal processing, it is possible to record signal patterns for pull-in of PLL at the time of data reproduction and AGC within the guard area or the preamble.

Figure 2:
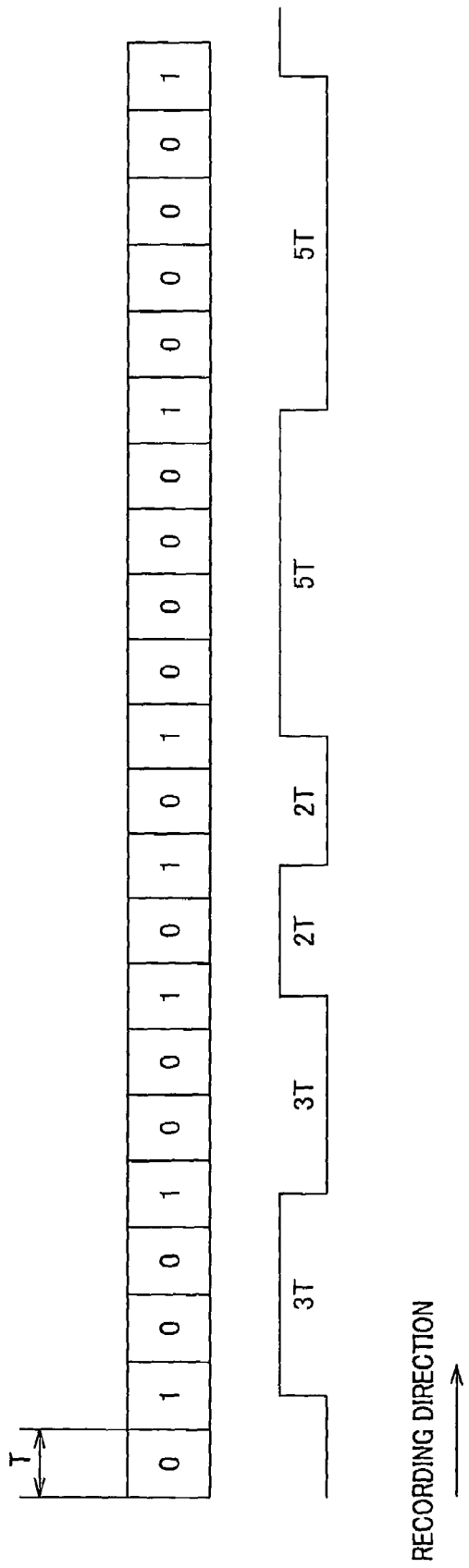
FIG. 2 is a view showing bit pattern suitable for PLL and/or AGC, etc.

As patterns respectively suitable for pull-in of PLL at the time of reproduction and AGC, it is preferable to use repetitive patterns of 3T/3T/2T/2T/5T/5T shown in FIG. 2. Here, "T" indicates data bit interval. When data is at "1" level, the state is inverted. Namely, for the purpose of pull-in of PLL, it is better that mark length is shorter. On the contrary, for the purpose of AGC, RF signal having level in which amplitude is saturated is required. For this reason, in order to satisfy both requirements, repetitive pattern of 3T/3T/2T/2T/5T/5T is suitable.

In addition, at the time of data recording, data run-in can also be used for Auto Power Control (APC) of laser power. For example, in the case where data run-in includes guard area for overlap at the time of recording, it is sufficient to record, into the guard area, signal pattern for APC according to power of light source.

Multi-purpose utilization can be made with respect to not only data run-in, but also data run-out.

The data run-out is buffer area for coping with change of recording position by SPS or recording start position accuracy similarly to the data run-in. Here, "SPS" stands for start position shift, which means position shift when start positions of respective recording unit blocks are shifted from the prescribed start position by random channel bit in order to avoid that disc may be damaged by overwrite operation.

The data run-out can also be used as buffer area in point of time for processing in which time is required, such as, for example, waveform equalization processing and Viterbi decoding, etc., at the time of reproduction. In the case where the data run-out includes postamble for time adjustment of signal processing, it is sufficient to record, into the postamble, signal pattern for PLL according to reproduction clock. With respect to this signal pattern, it is preferable to use repetitive pattern of 3T/3T/2T/2T/5T/5T which is suitable for PLL of reproduction clock used for processing in which time is required such as waveform equalization processing and Viterbi decoding processing, etc., at the time of reproduction.

In addition, at the time of recording end of block, the data run-out can also be used for APC of laser power.

In the linking system used in the present invention, there is provided means for enhancing synchronization establishment of data at the time of reproduction. For example, in the data run-in, plural synchronization patterns having distances and ID information (numbers) which are different from each other can be recorded into preamble for signal processing. Namely, synchronization establishment means using plural features such as not only pattern for synchronization establishment (hereinafter called "sync pattern") but also distance between sync patterns or ID numbers of sync is freely used to thereby have ability to effectively establish synchronization of data. The detail thereof will be described later.

Further, in the data-run out, plural means for detecting that block data reproduction has been completed are provided. Namely, in the data run-out, sync patterns for detecting reproduction end of the block are disposed. For example, as described later, in the case where postamble for time adjustment of signal processing and the guard area provided for adjustment of recording end position are included, it is sufficient to record, into the postamble, signal pattern for detecting reproduction end of the block. In practical sense, six times of repetitions of 9T which are unique pattern at the block are used to have ability to perform end detection of block.

Then, the information processing apparatus according to the present invention will be explained with reference to FIG. 3. The information processing apparatus 1 having recording/reproducing function to which the present invention has been applied is an optical recording/reproducing apparatus in which hardware such as CPU (Central Processing Unit), ROM (Read Only Memory), and RAM (Random Access Memory), etc. are included.

Figure 3:
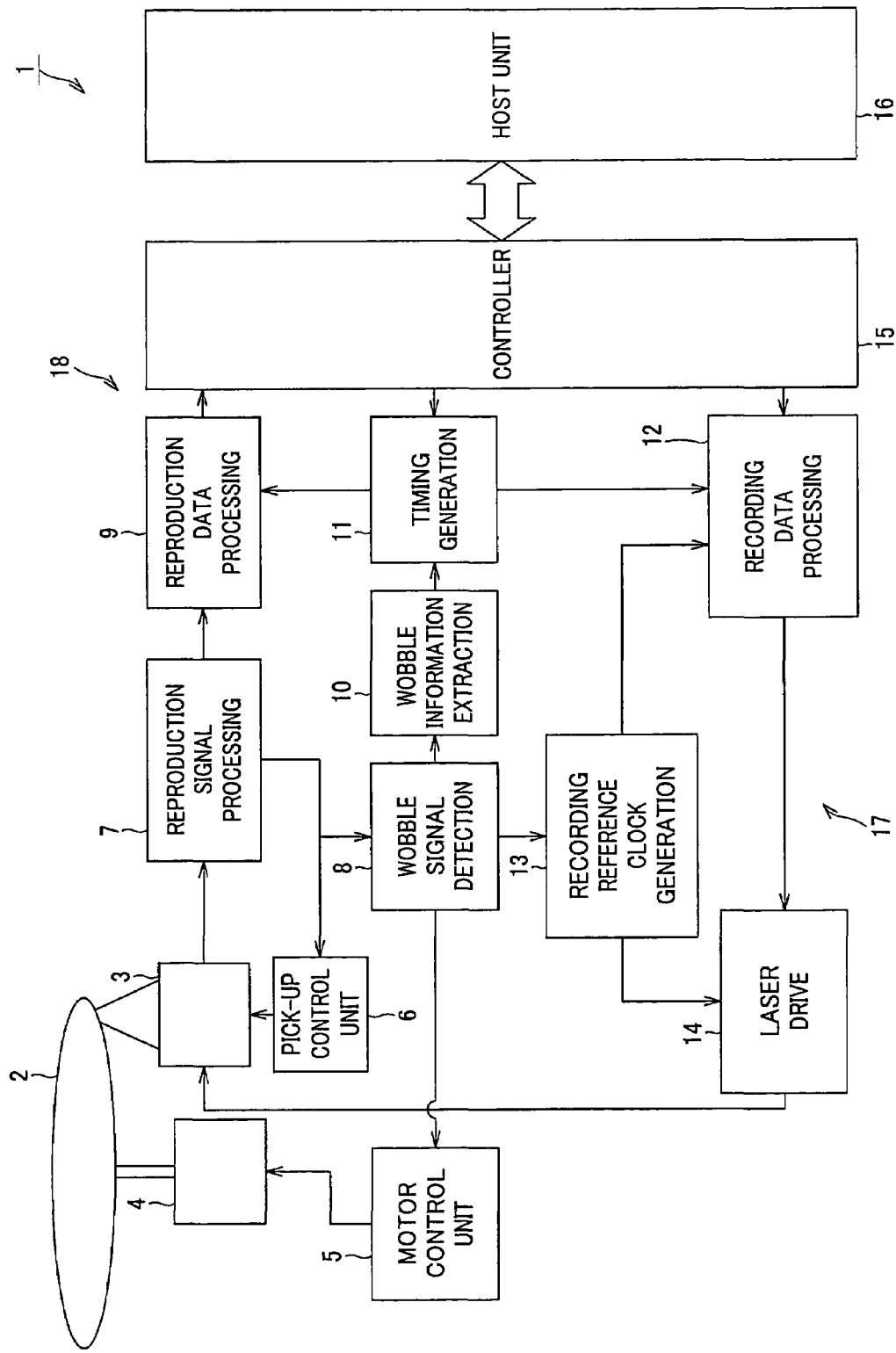
FIG. 3 is a block diagram showing an information processing apparatus to which the present invention is applied.

At the information processing apparatus 1 shown in FIG. 3, there is provided an optical pick-up (or optical head) 3 for performing read or write operation of information with respect to an optical disc 2 which is optical recording medium. The optical pick-up 3 is moved along the radial direction of the optical disc 2 by movement mechanism (not shown) so that visual field position of the object lens with respect to the optical disc 2 is controlled. The information processing apparatus 1 comprises a spindle motor 4 for rotating the optical disc 2. The spindle motor 4 is controlled by a motor control unit 5.

The optical pick-up 3 includes semiconductor laser serving as light source which emits light beams irradiated onto the optical disc 2, and light receiving element for receiving return light beams reflected by the optical disc 2, and serves to converge light beams emitted from the semiconductor laser onto the optical disc 2, and to receive return light beams reflected from the optical disc 2 to convert them into detection signal thereof to output it therefrom.

At the optical pick-up 3, there is provided a pick-up control unit 6 for performing control of the mechanism including actuator for object lens drive, etc. and feed control of the optical pick-up 3, etc. As the result of the fact that the actuator for object lens drive is controlled by the pick-up control unit 6, light beams which are irradiated onto the signal recording surface of the optical disc through the object lens and scan recording tracks formed at the optical disc are focused on the signal recording surface of the optical disc 2 so that the optical pick-up 3 is controlled in such a manner to follow the recording tracks to scan these recording tracks. In addition, the optical pick-up 3 is controlled by the pick-up control unit 6 so that positions with respect to inner circumference and outer circumference of the optical disc 2 are controlled.

Information signal recorded on the optical disc 2, which is obtained by receiving, by light receiving element, return light beams reflected from the optical disc 2, is sent to a reproduction signal processing unit 7.

The reproduction signal processing unit 7 is constituted by using read channel processor, etc., and its output is delivered to a wobble signal detecting unit 8, a reproduction data processing unit 9 and the pick-up control unit 6.

Wobble signal detected by the wobble signal detecting unit 8 constituted by wobble processor, etc. is sent to a wobble information extracting unit (address detector) 10, at which information such as address, etc. which specifies position on the optical disc is extracted.

The wobble signal consists of the so-called mono-tone signal portion, and signal portion in which address information indicating recording or reproduction start position has been caused to undergo MSK modulation. The wobble information extracting unit 10 performs detection and demodulation of address information from wobble signal to generate an address synchronizing signal. It is to be noted that while various values are conceivable with respect to period of wobble signal, 1 wobble (wobble period) is assumed to be 69 channel bits as a suitable value in the case where, e.g., influence given to recording or reproduction of channel bit and/or information quantity of address information are taken into consideration.

The address information detected at the wobble information extracting unit 10 is sent to a timing (signal) generating unit 11. As a result, recording/reproduction timing (read/write timing) signals of data are generated on the basis of the address information. This reproduction timing signal is sent to the reproduction data processing unit 9 and/or a recording data processing unit 12. In this example, the timing generating unit 11 generates a recording position control signal synchronous with address synchronizing signal and recording clock in accordance with recording/reproduction start address instruction, etc. from a controller 15 which will be described later to output it to modulation & synchronizing signal generating section within recording data processing unit 12 and demodulation & synchronization detecting section within the reproduction data processing unit 9.

The reproduction data processing unit 9 receives a signal from the reproduction signal processing unit 7 to perform processing such as demodulation, synchronization detection and ECC (Error Correcting Code) decoding, etc.

The recording data processing unit 12 performs processing such as modulation of data, synchronizing signal generation and/or ECC encoding, etc. to send out processing result (signal for recording) to laser drive unit 14.

The recording reference clock generating unit 13 serves to generate reference clock for recording from wobble signal from the wobble signal detecting unit 8. With respect to data recorded onto the optical disc 2, signal processing is performed on the basis of the recording clock signal. The recording reference clock generating unit 13 is ordinarily constituted by PLL circuit, and its output signal is sent to the recording data processing unit 12 or the laser drive unit 14.

The laser drive unit 14 serves to drive laser light source within the optical pick-up 3, and controls intensity and light quantity of laser so that they have desired values and modulates laser beams on the basis of recording data at the time of recording. At this time, modulation is performed with the above-described recording clock signal being as reference signal.

As the controller 15, there are provided controller including interface means with external host unit (host computer, etc.) 16, and controller including interface means with microcomputers for focus servo and tracking servo.

The recording processing is performed mainly by the recording data processing unit 12. Here, with recording clock signal from the recording reference clock generating unit 13 being as reference signal, ECC encoding processing, interleave processing, DC control processing and (1, 7) PP modulation processing are performed with respect to recording user data inputted from the controller 15. "PP" stands for "Parity preserve/Prohibit RMTR". Further, generation and addition processing of synchronization pattern and data run-in or data run-out are performed. Thus, recording channel data is generated. The detail of recording/reproduction channel data will be described later.

In other words, the recording data processing unit 12 constitutes the data recording unit 17 with respect to the optical disc 2 along with the recording reference clock generating unit 13, the laser drive unit 14 and the optical pick-up 3, etc. Recording channel data in which buffer areas for random access are added before and after respective blocks (data blocks) are generated. Thus, information including data and sync pattern, etc., are recorded onto the optical disc 2. It is to be noted that, although described later, guard area or areas is or are provided at the rear portion of one recording unit block, or at the rearmost portion of successive plural recording unit blocks (see FIGS. 4 and 5).

The controller 15 is connected to the host unit 16 such as host computer, etc., through interface, and serves to perform transmission/reception of data to and from the host unit 16 and to perform control of the entirety of the optical disc recording/reproducing apparatus as the information processing apparatus 1.

At the time of reproduction, control is made such that light beams emitted from the optical pick-up 3 are irradiated onto an arbitrary position of the optical disc 2. In this control, servo signal sent from the reproduction signal processing unit 7 to the pick-up control unit 6 is used.

At the reproduction signal processing unit 7, light receiving signal from the optical pick-up 3 is processed. Thus, reproduction signal, push-pull signal and servo signal are generated. At the reproduction signal processing unit 7, AGC (Auto Gain Control) processing, AD (Analog-to-Digital) conversion processing, waveform equalization processing and/or Viterbi decoding processing, etc., are performed with respect to reproduction signal. Thus, reproduction channel data is reproduced.

The reproduction data processing unit 9 of the succeeding stage detects synchronization pattern from reproduction channel data on the basis of reproduction timing signal from the timing generating unit 11 to perform (1, 7) PP demodualtion processing to reproduce user data via interleave (deinterleave) processing and ECC decoding processing. Further, user data is transferred to the host unit 16 through the controller 15.

The reproduction signal processing unit 7 and the reproduction data processing unit 9 constitute data reproduction unit 18 with respect to the optical disc 2 along with the optical pick-up 3, etc., and serve to perform not only main processing which is reproduction (restoring) of information, but also various signal processing followed thereby. For example, there is conducted processing such that signal pattern recorded at the data run-in is reproduced to use such reproduced signal pattern as signals for pull-in of PLL and AGC, or signal pattern recorded at the data run-in or the data run-out is reproduced to use the reproduced signal pattern as signal for APC of light source power. In addition to the above, those processing units take charge of processing such that, in the data run-in, plural synchronization patterns recorded at preamble for signal processing are reproduced to perform processing for establishment of synchronization, or in the data run-out, signal pattern recorded at the postamble for time adjustment of signal processing is reproduced to perform processing necessary for generation of reproduction clock, and/or to perform detection of reproduction end according to corresponding block, etc.

It is to be noted that, with respect to push-pull signal generated at the reproduction signal processing unit 7, reflected light from the optical disc 2 is received by light receiving elements bisected in parallel to the track tangential direction to detect such push-pull signal as difference signal between outputs by those bisected light receiving elements. Wobble signal is extracted from the push-pull signal by BPF (Band Pass Filter), etc.

In addition, the spindle motor 4 and the motor control unit 5 constitute rotation control means for optical disc, and serve to control rotation of the optical disc so that the wobble signal has a predetermined frequency. The optical disc on the turn table rotated by the spindle motor 4 is rotationally driven on the basis of control signal from the motor control unit 5.

Next, the detail of recording/reproduction channel data will be explained by using FIGS. 4 to 10.

It is to be noted that user data, i.e., data caused to undergo transmission/reception to and from application or Host, etc. is caused to undergo format processing at several stages, such as being converted in succession in order of "data frame or scrambled data frame→data block→LDC block→LDC cluster". Here, "LDC" is abbreviation of "Long Distance error correcting code", and permits removal of both random error and burst error.

Moreover, address and control data of DVR (Digital Video Recording) are converted in succession in order of "address block→BIS block→BIS cluster". Here, "BIS" stands for burst indicator subcode. BIS code word includes address and control data along user data, and is used for detection of long burst error.

LDC cluster and BIS cluster are multiplexed and modulated so that ECC cluster is provided.

At DVR, data are recorded in the state divided into unit (64 k bytes) called "physical cluster". 32 data frames of user data 2048 bytes are included in the physical cluster. By error correction of LDC and BIS, data is protected.

All data are constituted as one array as shown in the following Table 1, and data are read out along lateral direction of the Table. Further, bits for control of DC component (by DSV) are added to data. The data thus obtained are then modulated. After synchronization pattern is inserted, such data are recorded onto the disc.

as sequence of successive plural RUBs. In other words, even either one RUB or successive plural RUBs may exist. In the case where one RUB exists, guard area (indicated by "5") is positioned at the rear portion of the RUB. With respect to successive plural RUBs, guard area "5" is positioned at the rearmost portion of the last RUB. In short, guard area will be recorded after the last RUB. In this case, guard area "5" is an area for guaranteeing that gap does not take place between all two RUBs, and its length is 540 channel bits.

Figure 4:
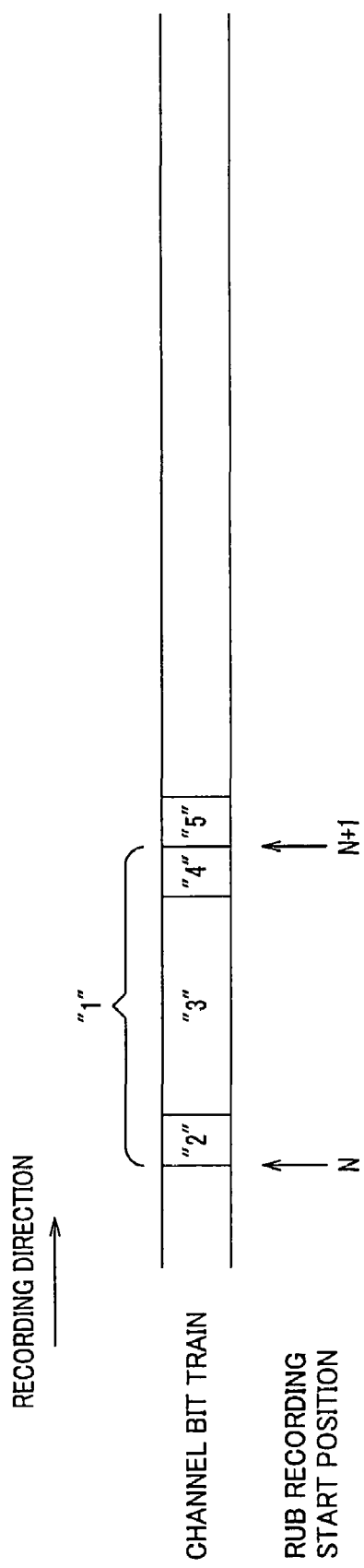

FIG. 4 shows the case where RUB corresponding to one block is singly recorded from RUB address N (indicating recording start position of RUB), wherein guard area "5" is positioned immediately after data run-out of the RUB.

Figure 5:
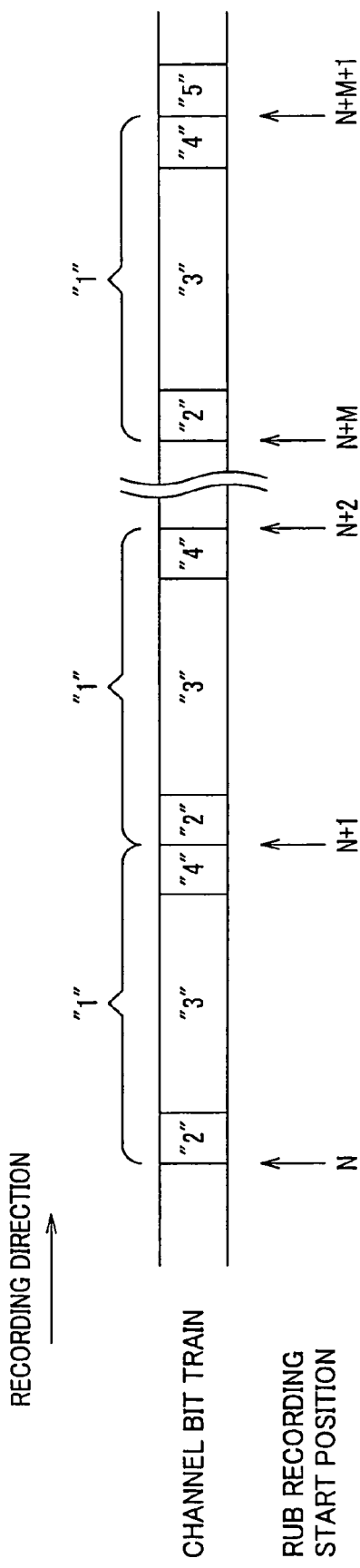

Moreover, FIG. 5 shows the case where RUBs corresponding to M blocks (M is natural number of 2 or more) are sequentially recorded with RUB address N being as starting point, wherein guard area "5" is positioned immediately after the "N+M"-th RUB. In the case where M successive blocks

TABLE 1

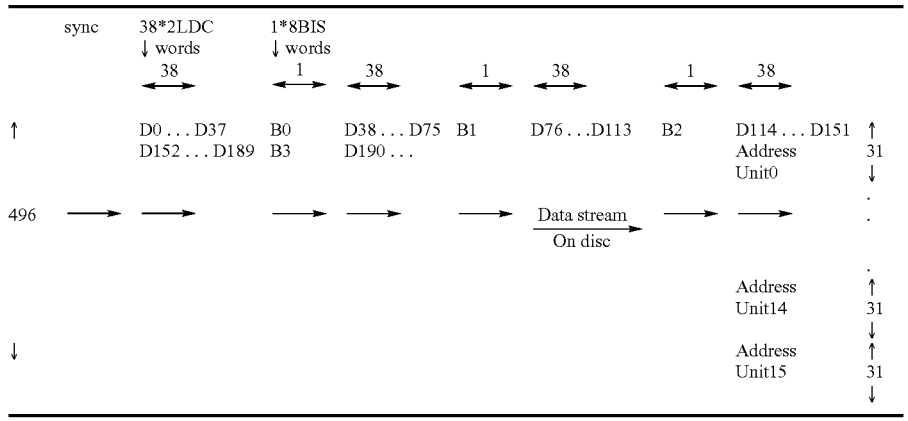

In this case, "sync" in the Table 1 indicates synchronization portion (sync), "DX" (X=0, 1, 2, . . . ) indicates LDC code word, and "BX" (X=0, 1, 2, . . . ) indicates BIS code word.

The LDC code word is interleaved in the diagonal direction of the Table 1. Moreover, the entirety of the physical cluster for addressing is partitioned (divided) into 16 address units (or physical sectors) respectively consisting of successive 31 lines.

Units of recording channel data and reproduction channel data are Recording Unit Block (hereinafter abbreviated as "RUB"). This RUB is adapted so that it starts from Data Run-in area of 2760 channel bits, clusters (physical clusters) which are set of modulated user data and the synchronization pattern thereof are successive, and it ends at Data Run-out area of 1104 channel bits.

In the channel bit example schematically shown in FIGS. 4 and 5, "1" indicates RUB, cluster indicated by "3" is located next to data run-in indicated in the state where "2" is attached, and data run-out indicated by "4" is positioned thereafter. In this example, these figures are codes attached to respective portions. It should be noted that figure itself within " " has no meaning.

Data run-in "2" and data run-out "4" provide sufficient buffer areas for facilitating complete random write or overwrite.

RUB "1" are recorded at predetermined positions designated by address on the disc by one block or as sequence of successive plural blocks. Namely, RUB is recorded singly or are recorded, data run-in and data run-out do not overlap between adjacent blocks of the blocks.

Figure 6:
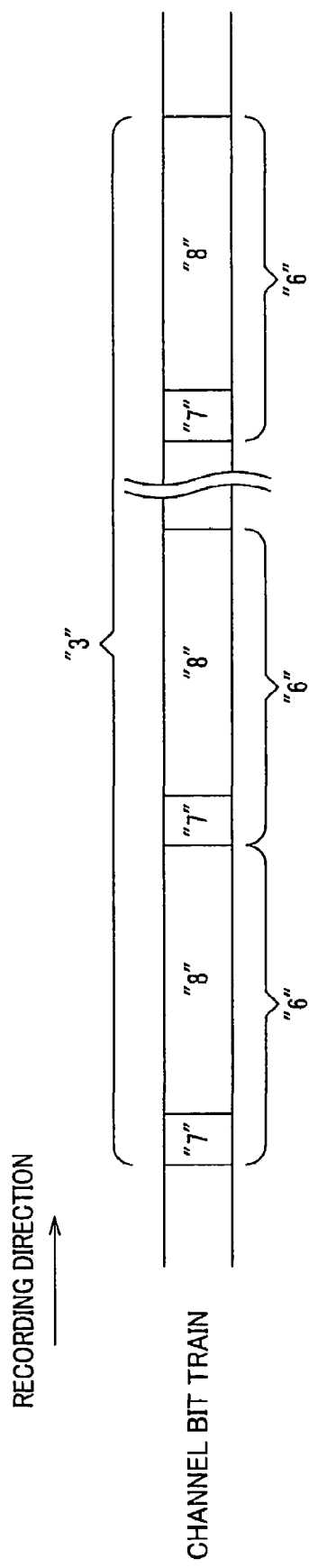

FIG. 6 shows the configuration within one cluster, wherein cluster "3" consists of plural frames indicated by "6", "6", . . . .

For example, the number of frames "6" which constitute RUB "1" is equal to 496. Frame "6" consists of frame data indicated by "8", and sync "7" which is the synchronizing signal thereof, wherein this sync is FS (Frame sync).

Modulated recording frame starts from FS consisting of 30 channel bits. As shown in the following Table 2, seven patterns of FS0 to FS6 are defined. The modulated recording frame includes 24 bit pattern (body portion) which is not in conformity with (1, 7) PP modulation rule, and "Signature" of 6 bits indicating ID (Identification information).

TABLE 2

| Sync Number | 24-bit sync body | 6-bit sync ID |
|---|---|---|
| FS0 | #01 010 000 000 010 000 000 010 | 000 001 |
| FS1 | #01 010 000 000 010 000 000 010 | 010 010 |
| FS2 | #01 010 000 000 010 000 000 010 | 101 000 |
| FS3 | #01 010 000 000 010 000 000 010 | 100 001 |
| FS4 | #01 010 000 000 010 000 000 010 | 000 100 |
| FS5 | #01 010 000 000 010 000 000 010 | 001 001 |
| FS6 | #01 010 000 000 010 000 000 010 | 010 000 |

In this example, pattern of FS (sync pattern) is determined by modulated bits, and "1" shown in the bit example in the Table 2 indicates inversion of signal. Before recording onto the disc, frame sync code is converted into NRZI channel bit stream.

Moreover, since it is insufficient to identify 31 recording frames by seven kinds of FSs, identification is performed by combination of plural FSs.

The first recording frame of each physical sector is caused to be FS0 (unique frame sync), and other frames are indicated as shown in the following Table 3. The Table 3 shows corresponding relationship of FS with respect to frame number.

TABLE 3

| Frame number | Frame Sync | Frame number | Frame Sync |
|---|---|---|---|
| 0 | FS0 | | |
| 1 | FS1 | 16 | FS5 |
| 2 | FS2 | 17 | FS3 |
| 3 | FS3 | 18 | FS2 |
| 4 | FS3 | 19 | FS2 |
| 5 | FS1 | 20 | FS5 |
| 6 | FS4 | 21 | FS6 |
| 7 | FS1 | 22 | FS5 |
| 8 | FS5 | 23 | FS1 |
| 0 | FS5 | 24 | FS1 |
| 10 | FS4 | 25 | FS6 |
| 11 | FS3 | 26 | FS2 |
| 12 | FS4 | 27 | FS6 |
| 13 | FS6 | 28 | FS4 |
| 14 | FS6 | 29 | FS4 |
| 15 | FS3 | 30 | FS2 |

When the Table 3 is used, sync of a certain frame sync and sync of frame precedent thereto are combined so that identification of recording frame can be made. Thus, it is possible to specify FS from combination of sync according to frame number n and sync according to either one of n−1, n−2, n−3, n−4. Even in the case where, e.g., current frame No. is assumed to be 5 and sync (FS1, FS2, FS3) are lost with respect to the first, second, and third frames precedent thereto, it is possible to identify frame from sync (FS3) of the fourth frame precedent by one frame and sync (FS1) of current frame (fifth frame). The case (possibility) where FS1 comes next to FS3 can take place only at specific portions in the above Table, i.e., frame numbers 4, 5.

The above description relating to RUB is made as the premise of SPS (Start Position Shift) of ±2 wobbles at the maximum and recording and reproduction position accuracy of ±0.5 wobbles. In this case, overlap portion between RUBs by recording in the case of random access falls within the range from 3 to 13 wobbles. In addition, the minimum length of data run-in area which is not caused to overlap approximately becomes equal to 27 wobbles. This length corresponds to about one recording frame, and is sufficient length as buffer area for pull-in of PLL and/or signal processing.

Figure 7:
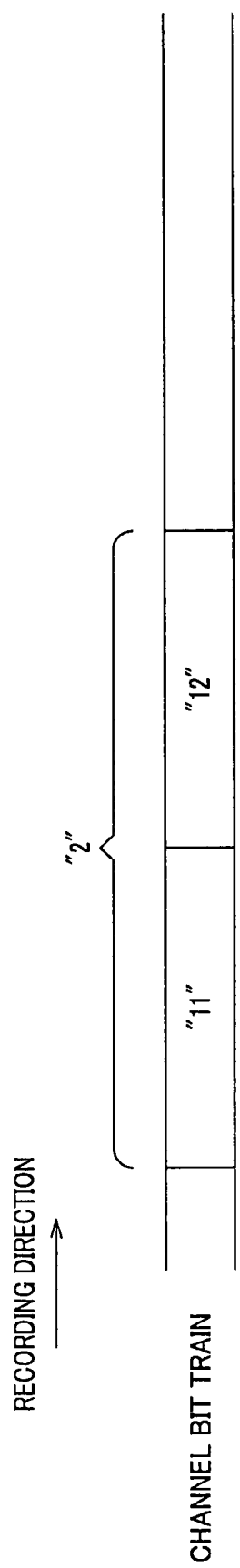

FIG. 7 shows the configuration of data run-in.

Data run-in "2" consists of guard area (1100 channel bits) indicated in the state where "11" is attached, and preamble (1660 channel bits) indicated in the state where "12" is attached. The guard area "11" is buffer area for overlap resulting from SPS and/or start position accuracy of overlap recording operation. In addition, the preamble "12" is buffer area for signal processing (lock, taking of synchronization).

The guard area "11" has length of 1100 channel bits, and its channel bit pattern is repetition of 55 times of 01[0]$^2$1[0]$^2$10101[0]$^4$1[0]$^3$. Here, in the representation of 01[0]$^2$1[0]$^2$10101[0]$^4$1[0]$^3$, 0 and 1 respectively indicate non-inversion and inversion of write channel bit train at NRZI (Non Return to Zero Inverted) onto the disc. Moreover, brackets [ ] and figures with superscript succeeding thereto indicate repetition of the number of times of figures with superscript of pattern within brackets.

The repetitive pattern of 01[0]$^2$1[0]$^2$10101[0]$^4$1[0]$^3$ results in repetition of 3T/3T/2T/2T/5T/5T (see FIG. 2). This pattern is pattern suitable for respective processing of pull-in of PLL at the time of reproduction and AGC. Namely, for the purpose of pull-in of PLL, it is better that the mark length is short. However, for the purpose of AGC, RF signal having level in which amplitude is saturated is required. The repetitive pattern of 3T/3T/2T/2T/5T/5T is suitable pattern for such demand, and is pattern respectively suitable in regard to both features, i.e., pull-in of PLL at the time of reproduction and AGC.

Moreover, the first 5 wobbles of the guard area "11" at the start of the recording sequence can be used for automatic adjustment (APC) of laser power. Namely, as modulation bit pattern used in APC, [0]$^2$1 [0]$^2$10101[0]$^4$1[0]$^3$ or pattern optimum for APC can be arbitrarily selected.

Figure 8:
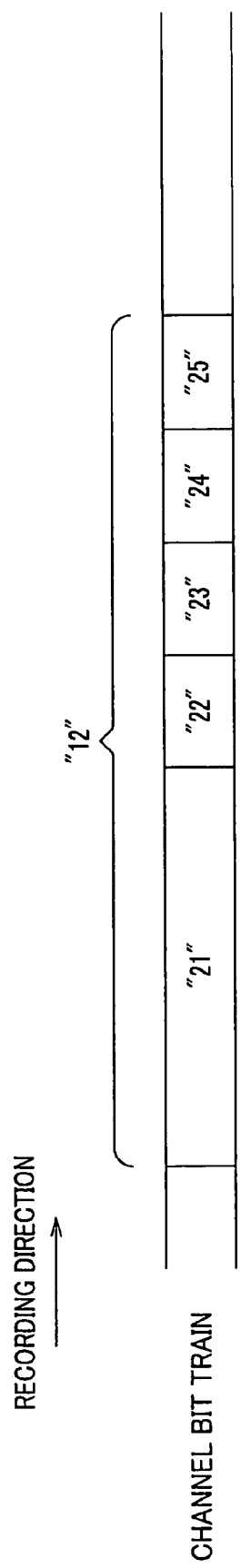

FIG. 8 shows the configuration of preamble.

The preamble "12" has length of 1660 channel bits. This preamble is constituted by repetitive pattern indicated in the state where "21" is attached (repetitions of 77 times of 01[0]$^2$1 [0]$^2$10101[0]$^4$1[0]$^3$), synchronization pattern (sync) indicated in the state where "22" is attached, repetitive pattern indicated in the state where "23" is attached (repetitions of two times of 01[0]$^2$1[0]$^2$10101[0]$^4$1[0]$^3$), synchronization pattern (sync) indicated in the state where "24" is attached, and repetitive pattern indicated in the state where "25" is attached (one time of 01[0]$^2$1[0]$^2$10101[0]$^4$1[0]$^3$). Here, sync "22" and sync "24" are caused to be above-described FS. In the rule of this FS, sync "22" is. FS[mod({N+4, 7})] (where "mod(x, a)" indicates remainder when x is divided by a), sync "24" is FS[mod({N+6, 7})] (where X=0 to 6, and FS[X] corresponds to "FSX" in the Tables 2 and 3). It is to be noted that this is the case where the first frame succeeding to preamble "12" is FS[N]. For example, in the case where the first FS (hereinafter referred to as "FFSO") after preamble "12" is FS0, it is implied that sync "22" is FS4 and sync "24" is FS6.

Since sync "22", sync "24" and FFSO are in conformity with generation rule of FS, IDs are different from each other. Thus, even in the case where two synchronization patterns among three synchronization patterns cannot be detected by disturbance, synchronization of cluster can be established in the case where the remaining one synchronization pattern is detected and ID of synchronization pattern can be normally read out. In addition, sync "22", sync "24" and FFSO have distances therebetween which are different from each other (intervals of channel bits are different from each other). For this reason, even in the case where one synchronization pattern cannot be detected by disturbance among three synchronization patterns and even in the case where the remaining two synchronization patterns are detected and IDs of the synchronization pattern which can be detected cannot be normally read out, synchronization of cluster can be established.

Figure 9:
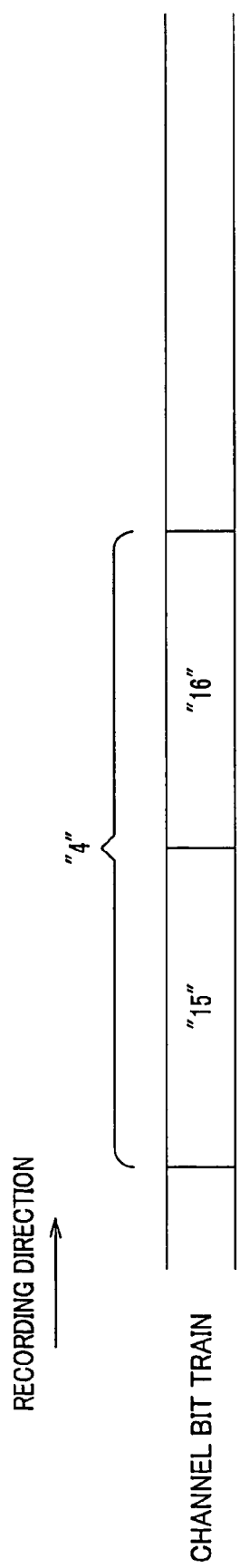

FIG. 9 shows the configuration of data run-out.

Data run-out "4" consists of postamble indicated in the state where "15" is attached (564 channel bits), and guard area indicated in the state where "16" is attached (540 channel bits). The postamble "15" is buffer area in point of time for processing in which time is required such as waveform equalization processing and Viterbi decoding processing, etc., at the time of reproduction. In addition, the guard area "16" is buffer area in which change of recording position by SPS or recording start position accuracy is taken into consideration similarly to the guard area "11".

Figure 10:
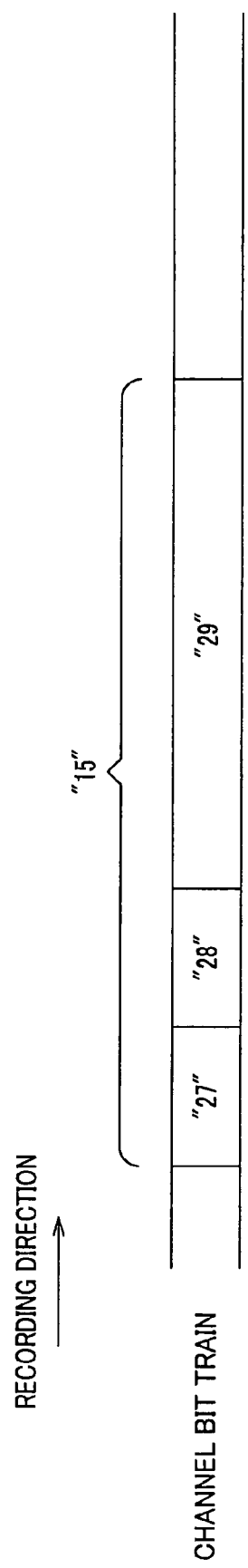

FIG. 10 shows a configuration example of postamble.

Postamble "15" is constituted by sync indicated in the state where "27" is attached, unique pattern indicated in the state where "28" is attached ($01[0]^81[0]^81[0]^81[0]^81[0]^81[0]^7$), and repetitive pattern indicated in the state where "29" is attached (repetitions of 24 times of $01[0]^21[0]^210101[0]^41[0]^3$). Here, sync "27" is FS0. Moreover, unique pattern "28" (repetitions of six times of 9T) is unique pattern at RUB, i.e., does not appear at other portions of RUB, and can be used for detecting end of cluster. Further, repetitive pattern "29" is pattern suitable for PLL of reproduction clock used for processing in which time is required such as waveform equalization processing and/or Viterbi decoding processing, etc., at the time of reproduction.

Guard area "5" (see FIGS. 4 and 5) has length of 540 channel bits, and its bit pattern is repetitions of 27 times of $01[0]^21[0]^210101[0]^41[0]^3$. In addition, at the last portion of the recording sequence, the last five wobbles of the guard area "5" can be used for the above-mentioned APC for laser beams. As modulation bit pattern used in the APC, it is possible to arbitrarily select $01[0]^21[0]^210101[0]^41[0]^3$ or optimum pattern for APC.

In accordance with the above-described configuration, merits as shown below can be obtained.

In the optical disc recording/reproducing apparatus of large capacity adapted for performing write-once or rewrite operation of data on recordable optical disc according to the present invention, compatibility with hardware which constitutes read only reproduction only machine is improved. Namely, it is unnecessary to greatly change the circuit configuration of the reproduction only machine in consideration of the fact that existence of gap of reproduction waveform based on gap between blocks is taken into consideration. Thus, it is possible to reproduce recordable optical disc by less additional cost with respect to the read only reproduction only machine.

Since the optical disc according to the present invention and the information processing apparatus using such optical disc as recording medium is excellent in the random accessibility, the optical disc and the information processing apparatus can exhibit excellent performance also in the case where they are applied to all optical discs for AV (audio, video) or computer storage, and/or optical disc recording/reproducing apparatuses.

Since the optical disc according to the present invention can use the linking area in multi-purpose manner, area which cannot be used for data recording can be reduced. Thus, efficient data recording can be performed.

In the optical disc according to the present invention, plural synchronization patterns of data are arranged in devised manner within the linking area to thereby have ability to effectively perform synchronization establishment of data. Thus, data readability at the time of reproduction is improved. In addition, end detection of block reproduction is enhanced. As a result, the influence of step-out (pull-out) of synchronization by defect, etc. is difficult to be given to blocks of the succeeding stage. Thus, data readability at the time of sequence reproduction is improved.

While explanation has been given in the above-described examples by taking the example where the present invention is applied to the optical disc, since the form of the optical recording medium according to the present invention is arbitrary, the present invention can be applied to various forms such as tape shape and/or card shape, etc. without being limited to disc shape.

It is to be noted that while the invention has been described in accordance with preferred embodiments thereof illustrated in the accompanying drawings and described in the above description in detail, it should be understood by those ordinarily skilled in the art that the invention is not limited to embodiments, but various modifications, alternative constructions or equivalents can be implemented without departing from the scope and spirit of the present invention as set forth and defined by appended claims.

INDUSTRIAL APPLICABILITY

As described above, in accordance with the optical recording medium according to the present invention and the information processing apparatus using such recording medium, buffer areas are provided before and after block to thereby have ability to easily perform random access. Accordingly, the present invention is excellent in point of random accessibility as compared to the system of performing continuous write operation of block in the state where the linking portion does not exist. Further, linking area is formed by buffer areas overlapping with each other so that any gap does not take place between blocks to thereby prevent drawbacks based on gap of reproduction waveform resulting from existence of the gap, e.g., change of the circuit design, switching of operational mode of circuit corresponding to presence/absence of gap, and/or switching of the circuit itself, etc. Thus, it is possible to guarantee compatibility of hardware. In addition, there is no possibility that remarkable cost elevation may not be involved for that purpose.

The invention claimed is:

1. An optical recording medium in which a write-once or rewrite operation of data can be performed with a block including a group of data as a unit,
    wherein buffer areas having a fixed length for random access are respectively disposed before and after respective blocks,
    whereby when a new block is recorded a start point for the fixed length buffer area before the new block is not fixed relative to an existing block preceding the new block, and the new block is recorded in a state that the fixed length buffer area provided with respect to the new block and the fixed length buffer area provided with respect to the existing block adjacent to the new block overlap with each other,
    wherein the fixed length buffer area disposed immediately before a respective of the blocks includes a preamble for signal processing, and plural synchronization patterns having distances and identification information that are different from each other are recorded at the preamble.

2. The optical recording medium as set forth in claim 1, wherein a recording unit block is constituted by a respective of the blocks and the fixed length buffer areas before and after the respective block, and a guard area or areas is or are provided at a rear portion of one recording unit block or at a rearmost portion of successive plural recording unit blocks.

3. The optical recording medium as set forth in claim 1, wherein the fixed length buffer area disposed immediately before a respective of the blocks includes a guard area for overlap at a time of recording, and signal patterns for a frequency pull-in of a Phase Locked Loop (PLL) at a time of data reproduction and an Auto Gain Control (AGC) are recorded at the guard area or the preamble.

4. The optical recording medium as set forth in claim 3, wherein the signal pattern is a repetitive pattern of 3T/3T/2T/2T/5T/5T.

5. The information processing apparatus as set forth in claim 3, further comprising:

data reproducing means for reproducing a signal pattern recorded within a guard area for overlap at a time of recording of the fixed length buffer area or areas disposed immediately before or immediately after a respective of the blocks, to use the signal pattern thus reproduced as a signal for automatic adjustment according to a power of a light source.

6. The optical recording medium as set forth in claim 1, wherein the fixed length buffer area or areas disposed immediately before or immediately after a respective of the blocks includes or include a guard area for overlap at a time of recording, and a signal pattern for automatic adjustment according to a power of a light source is recorded within the guard area.

7. The optical recording medium as set forth in claim 6, wherein the signal pattern is a repetitive pattern of 3T/3T/2T/2T/5T/5T.

8. The optical recording medium as set forth in claim 1, wherein the fixed length buffer area disposed immediately before a respective of the blocks includes a guard area for overlap at a time of recording.

9. The optical recording medium as set forth in claim 1, wherein the fixed length buffer area disposed immediately after a respective of the blocks includes a postamble for time adjustment of signal processing and a guard area for adjustment of a recording end position, and a signal pattern for a Phase Locked Loop (PLL) according to a reproduction clock is recorded at the postamble.

10. The optical recording medium as set forth in claim 9, wherein the signal pattern is a repetitive pattern of 3T/3T/2T/2T/5T/5T.

11. The optical recording medium as set forth in claim 1, wherein the fixed length buffer area disposed immediately after a respective of the blocks includes a postamble for time adjustment of signal processing and a guard area for adjustment of a recording end position, and a signal pattern for detecting a reproduction end of the block is recorded at the postamble.

12. An information processing apparatus adapted for performing recording or reproduction of information with respect to an optical recording medium in which a write-once or rewrite operation of data can be performed with a block including a group of data as a unit, the information processing apparatus including data recording means for generating recording channel data in which buffer areas having a fixed length for random access are added before and after respective blocks to record the data onto an optical recording medium, wherein when recording of a new block is started with respect to a first block that has been already recorded, a start point for the fixed length buffer area before the new block is not fixed relative to the first block preceding the new block, and the new block is recorded in a state that the fixed length buffer area disposed immediately before the new block and the fixed length buffer area provided with respect to the new block overlap with each other, and when recording of the new block is completed, the new block is recorded in a state that the fixed length buffer area disposed immediately after the new block and the fixed length buffer area disposed immediately before a next block adjacent to the new block overlap with each other, and further comprising data reproducing means for reproducing plural synchronization patterns recorded at a preamble for signal processing of the fixed length buffer area disposed immediately before a respective of the blocks to establish synchronization.

13. The information processing apparatus as set forth in claim 12, wherein recording and reproduction are performed with recording a unit block including a respective of the blocks and the fixed length buffer areas before and after the respective block as a processing unit, and a guard area or areas is or are provided at a rear portion of one recording unit block, or at a rearmost portion of successive plural recording unit blocks at a time of recording of recording channel data.

14. The information processing apparatus as set forth in claim 12, wherein the fixed length buffer area disposed immediately before a respective of the blocks includes a guard area for overlap at a time of recording, the information processing apparatus further comprising:

data reproducing means for reproducing a signal pattern recorded at the guard area or the preamble to use the signal pattern thus reproduced as a signal for a frequency pull-in of a Phase Locked Loop (PLL) and an Auto Gain Control (AGC).

15. The information processing apparatus as set forth in claim 12, further comprising:

data reproducing means for reproducing a signal pattern recorded at a postamble for time adjustment of a signal processing of the fixed length buffer area disposed immediately after a respective of the blocks to use the signal pattern thus reproduced as a Phase Locked Loop (PLL) of a reproduction clock.

16. The information processing apparatus as set forth in claim 12, further comprising:

data reproducing means for reproducing a signal pattern recorded at a postamble for time adjustment of a signal processing of the fixed length buffer area disposed immediately after a respective of the blocks to perform detection of a reproduction end according to the respective block.

17. A recording method for performing a write-once or rewrite operation of data with a block including a group of data as a unit, wherein buffer areas having a fixed length for random access are respectively disposed before and after respective blocks, whereby when a new block is recorded, a start point for the fixed length buffer area before the new block is not fixed relative to an existing block preceding the new block, and the new block is recorded in a state that the fixed length buffer area provided with respect to the new block and the fixed length buffer area provided with respect to the existing block adjacent to the new block overlap with each other, wherein the fixed length buffer area disposed immediately before a respective of the blocks includes a preamble for signal processing, and plural synchronization patterns having distances and identification information that are different from each other are recorded at the preamble.

18. The recording method as set forth in claim 17, wherein a recording unit block is constituted by a respective of the blocks and the fixed length buffer areas before and after the respective block, and a guard area or areas is or are provided at a rear portion of one recording unit block or at a rearmost portion of successive plural recording unit blocks.

19. The recording method as set forth in claim 17, wherein the fixed length buffer area disposed immediately before a respective of the blocks includes a guard area for overlap at a time of recording, and signal patterns for a frequency pull-in of a Phase Locked Loop (PLL) at a time of data reproduction and an Auto Gain Control (AGC) are recorded at the guard area or the preamble.

20. The recording method as set forth in claim 19, wherein a repetitive pattern of 3T/3T/2T/2T/5T/5T is recorded as the signal pattern.

21. The recording method as set forth in claim 17, wherein the fixed length buffer area or areas disposed immediately before or immediately after a respective of the blocks includes or include a guard area for overlap at a time of recording, and a signal pattern for automatic adjustment according to a power of a light source is recorded within the guard area.

22. The recording method as set forth in claim 21, wherein a repetitive pattern of 3T/3T/2T/2T/5T/5T is recorded as the signal pattern.

23. The recording method as set forth in claim 17, wherein the fixed length buffer area disposed immediately before a respective of the blocks includes a guard area for overlap at a time of recording.

24. The recording method as set forth in claim 17, wherein the fixed length buffer area disposed immediately after a respective of the blocks includes a postamble for time adjustment of signal processing and a guard area for adjustment of a recording end position, and a signal pattern for a Phase Locked Loop (PLL) according to a reproduction clock is recorded at the postamble.

25. The recording method as set forth in claim 24, wherein a repetitive pattern of 3T/3T/2T/2T/5T/5T is recorded as the signal pattern.

26. The recording method as set forth in claim 17, wherein the fixed length buffer area disposed immediately after a respective of the blocks includes a post-amble for time adjustment of signal processing and a guard area for adjustment of a recording end position, and a signal pattern for detecting a reproduction end of the block is recorded at the post-amble.

* * * * *